(12) United States Patent
Luce (10) Patent No.: US 10,486,802 B2
(45) Date of Patent: Nov. 26, 2019

(54) LANDING GEAR ARRANGEMENT WITH PASSIVE SHOCK STRUT SHRINK ACTUATOR

(71) Applicant: Goodrich Corporation, Charlotte, NC (US)

(72) Inventor: William E. Luce, Colleyville, TX (US)

(73) Assignee: Goodrich Corporation, Charlotte, NC (US)

( * ) Notice: Subject to any disclaimer, the term of this patent is extended or adjusted under 35 U.S.C. 154(b) by 261 days.

(21) Appl. No.: 15/483,788

(22) Filed: Apr. 10, 2017

(65) Prior Publication Data

US 2018/0079496 A1 Mar. 22, 2018

Related U.S. Application Data

(60) Provisional application No. 62/396,645, filed on Sep. 19, 2016.

(51) Int. Cl.
*B64C 25/18* (2006.01)
*B64C 25/60* (2006.01)
*B64C 25/00* (2006.01)
*B64C 25/34* (2006.01)
*F16F 9/56* (2006.01)
*B64C 25/10* (2006.01)
*B64C 25/22* (2006.01)

(52) U.S. Cl.
CPC ............ *B64C 25/60* (2013.01); *B64C 25/001* (2013.01); *B64C 25/10* (2013.01); *B64C 25/18* (2013.01); *B64C 25/22* (2013.01); *B64C 25/34* (2013.01); *F16F 9/56* (2013.01); *B64C 2025/008* (2013.01); *F16F 2230/16* (2013.01); *F16F 2230/183* (2013.01)

(58) Field of Classification Search
CPC ......... B64C 25/60; B64C 25/22; B64C 25/10; B64C 25/18; B64C 25/34; B64C 25/001; B64C 2025/008; F16F 9/56; F16F 2230/16; F16F 2230/183
USPC ........................................................ 244/102
See application file for complete search history.

(56) References Cited

U.S. PATENT DOCUMENTS

| 2,186,266 | A |   | 1/1940  | Onions |
|-----------|---|---|---------|--------|
| 2,294,918 | A |   | 9/1942  | Lucien |
| 2,554,581 | A | * | 5/1951  | Lucien ................... B64C 25/60 244/102 R |
| 2,856,180 | A |   | 10/1958 | Westcott, Jr. |

(Continued)

FOREIGN PATENT DOCUMENTS

| EP | 2860102 | 4/2015  |
|----|---------|---------|
| EP | 2927117 | 10/2015 |

OTHER PUBLICATIONS

European Patent Office, European Search Report dated Feb. 2, 2018 in Application No. 17187067.8-1010.

(Continued)

*Primary Examiner* — Claude J Brown
(74) *Attorney, Agent, or Firm* — Snell & Wilmer, L.L.P.

(57) ABSTRACT

A landing gear arrangement may comprise a shock strut, a retraction actuator, and a shrink actuator. The retraction actuator may move the shock strut between a stowed position and a deployed position. The shrink actuator may move between a shrink position and an unshrink position in response to the shock strut moving between the stowed position and the deployed position.

17 Claims, 8 Drawing Sheets

(56) References Cited

U.S. PATENT DOCUMENTS

| | | | | |
|---|---|---|---|---|
| 2,892,626 | A * | 6/1959 | Hogan | B64C 25/22 244/102 R |
| 3,011,777 | A * | 12/1961 | Stout | B64C 25/22 244/102 R |
| 4,047,681 | A * | 9/1977 | Hartel | B64C 25/12 244/102 SS |
| 4,088,286 | A * | 5/1978 | Masclet | B64C 25/60 244/102 SL |
| 4,291,850 | A * | 9/1981 | Sharples | B60G 17/04 244/102 SS |
| 4,907,760 | A * | 3/1990 | Sealey | B64C 25/60 244/100 R |
| 5,908,174 | A * | 6/1999 | Churchill | B64C 25/18 244/102 SS |
| 6,120,009 | A | 9/2000 | Gatehouse et al. | |
| 8,070,095 | B2 | 12/2011 | Luce | |
| 8,556,209 | B2 | 10/2013 | Luce | |
| 8,727,273 | B2 | 5/2014 | Luce | |
| 8,998,133 | B2 | 4/2015 | Cottet | |
| 9,061,759 | B2 | 6/2015 | Ditzler | |
| 9,321,525 | B2 | 4/2016 | Luce | |
| 9,403,592 | B2 | 8/2016 | Kallio | |
| 2010/0096499 | A1 * | 4/2010 | Luce | B64C 25/14 244/102 SS |
| 2010/0219290 | A1 | 9/2010 | Luce | |
| 2015/0101480 | A1 * | 4/2015 | Luce | B64C 25/18 92/61 |
| 2015/0102163 | A1 | 4/2015 | Luce | |
| 2015/0274283 | A1 | 10/2015 | Luce | |

OTHER PUBLICATIONS

European Patent Office, European Search Report dated May 9, 2019 in Application No. 17187067.8.

* cited by examiner

LANDING GEAR ARRANGEMENT WITH PASSIVE SHOCK STRUT SHRINK ACTUATOR

CROSS REFERENCE TO RELATED APPLICATIONS

This application claims priority to, and the benefit of, U.S. Provisional Patent Application Ser. No. 62/396,645, entitled "TRUNNION MOUNTED SHOCK STRUT SHRINK MECHANISM," filed on Sep. 19, 2016, The '645 Application is hereby incorporated by reference in its entirety for all purposes.

FIELD

The present disclosure relates to landing gear systems and, more specifically, to a shrinking system for use with a landing gear.

BACKGROUND

Aircraft wheel wells are frequently too small to fit an extended landing gear strut. Thus, landing gear struts are often compressed as the landing gear is retracted into the wheel well. As aircraft evolve, increased gross weight may drive a larger engine size and longer struts when extended to maintain ground clearance. For inward retracting main landing gears, the landing gear length is typically accommodated by pushing the attach points outward along the wing or shrinking the strut during (or prior to) retraction. Pushing the landing gear attach points outward creates a significant change to the wing.

SUMMARY

A landing gear arrangement is disclosed herein, in accordance with various embodiments. The landing gear arrangement may comprise a shock strut, a retraction actuator, and a shrink actuator, wherein the retraction actuator moves the shock strut between a stowed position and a deployed position, and the shrink actuator moves between a shrink position and an unshrink position in response to the shock strut moving between the stowed position and the deployed position.

In various embodiments, the shrink actuator may be driven by the retraction actuator. The retraction actuator may drive the shock strut, and the shrink actuator may be driven in response to the retraction actuator driving the shock strut. The shrink actuator may be driven by the shrink actuator, via the shock strut. The shrink actuator may comprise a passive system. The shrink actuator may be coupled between the shock strut and a first pivot. The retraction actuator may be coupled between the shock strut and a second pivot.

A shrink actuator for a landing gear is disclosed herein, in accordance with various embodiments. The shrink actuator for the landing gear may comprise a piston housing defining a cavity, a piston comprising a piston rod and a piston head, a first port disposed in the piston housing, a second port disposed in the piston housing, and a valve coupled to the piston housing, wherein the valve is configured to actuate in response to the piston moving between an unshrink position and a shrink position.

In various embodiments, the shrink actuator may further comprise a piston ring disposed within the cavity, and a first spring member operatively coupled to the piston ring. The valve may comprise a valve housing, a plunger, and a second spring member operatively coupled to the plunger, wherein the piston head is configured to engage the piston ring, and wherein the piston ring is configured to engage the plunger to actuate the valve. The piston head may separate the cavity into a first chamber and a second chamber. The first chamber and the second chamber may be in fluid communication in response to the valve moving to an open position. The valve may be configured to be in the open position in response to the landing gear moving to a deployed position. The first port may be in fluid communication with the first chamber and the second port is in fluid communication with the second chamber. The first port may be configured to be in fluid communication with a strut hydraulic fluid chamber and the second port is configured to be in fluid communication with a strut shrink chamber. The piston head may comprise a ramp surface configured to engage the plunger. The piston head may comprise a slot, wherein in response to the piston head engaging the piston ring, the slot partially defines a flow path between the first port and the second port.

A method is disclosed herein, in accordance with various embodiments. The method may comprise actuating a retraction actuator of a landing gear arrangement, moving a landing gear to at least one of a deployed position and a stowed position in response to the actuating, moving hydraulic fluid between a landing gear strut shrink chamber and a shrink actuator chamber of a shrink actuator in response to the moving, and causing a shock strut to at least one of shrink and unshrink in response to the moving the hydraulic fluid.

In various embodiments, the method may further comprise engaging a piston ring of the shrink actuator to at least one of open and close a valve of the shrink actuator, and causing an overflow chamber to be in fluid communication with the shrink actuator chamber in response to the valve opening. The method may further comprise pivoting the shrink actuator in response to the actuation of the retraction actuator, and causing, by the retraction actuator, a piston of the shrink actuator to at least one of retract and extend in response to the pivoting.

BRIEF DESCRIPTION OF THE DRAWINGS

The subject matter of the present disclosure is particularly pointed out and distinctly claimed in the concluding portion of the specification. A more complete understanding of the present disclosure may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. As used herein, phrases such as "make contact with," "coupled to," "touch," "interface with" and "engage" may be used interchangeably.

Landing gear arrangements, as described herein, may comprise a retraction actuator, a shrink actuator, and a shock strut. The shrink actuator may be passively actuated in response to rotation of the shock strut. For example, the retraction actuator may be actuated to rotate the shock strut between a stowed position and a deployed position. The rotation of the shock strut may mechanically force the shrink actuator to at least one of extend or compress between a shrink position and an unshrink position. The shock strut may compress, or shrink, in response to the shrink actuator moving to the shrink position. The shock strut may extend, or unshrink, in response to the shrink actuator moving to the unshrink position. In this regard, the movement of the shrink actuator may be tuned independently of the retraction actuator. Furthermore, the shrink actuator may comprise a passive system. The hydraulic fluid in the shrink actuator may be isolated from the hydraulic fluid in the retraction actuator.

In various embodiments, a landing gear arrangement may comprise a landing gear, a retraction actuator, and a shrink actuator. For example, with reference to FIG. 1A and FIG. 1B, a landing gear arrangement 30 is illustrated, in accordance with various embodiments. Landing gear arrangement 30 may comprise a retraction actuator 10, a shrink actuator 20, and a shock strut 32. In various embodiments, aircraft structure 50 may comprise a hydraulic supply to actuate retraction actuator 10.

Figure 1A:
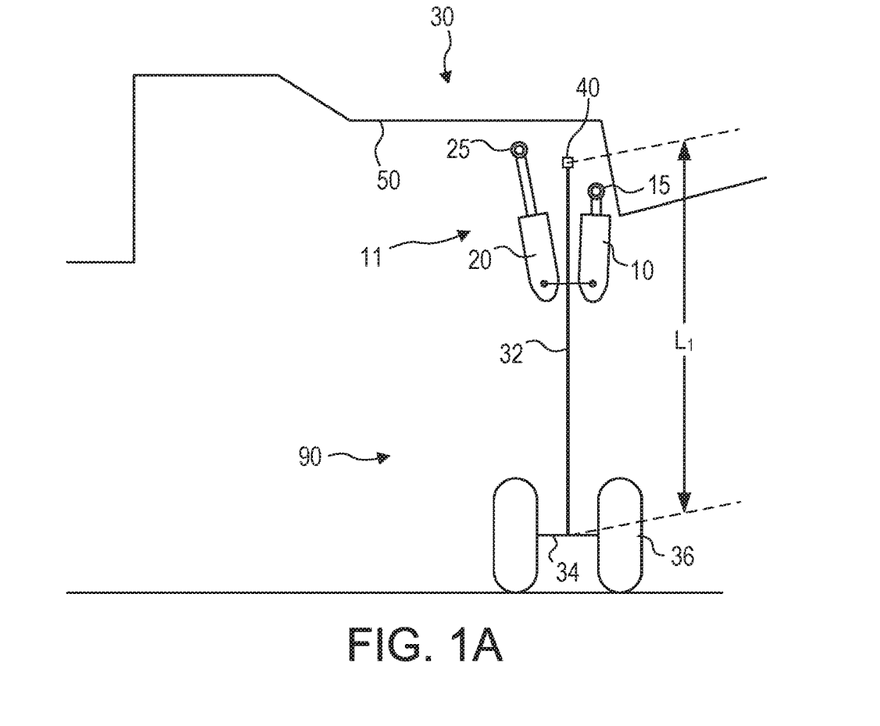
FIG. 1A illustrates a schematic diagram of a landing gear arrangement in a fully deployed position, in accordance with various embodiments.
Figure 1B:
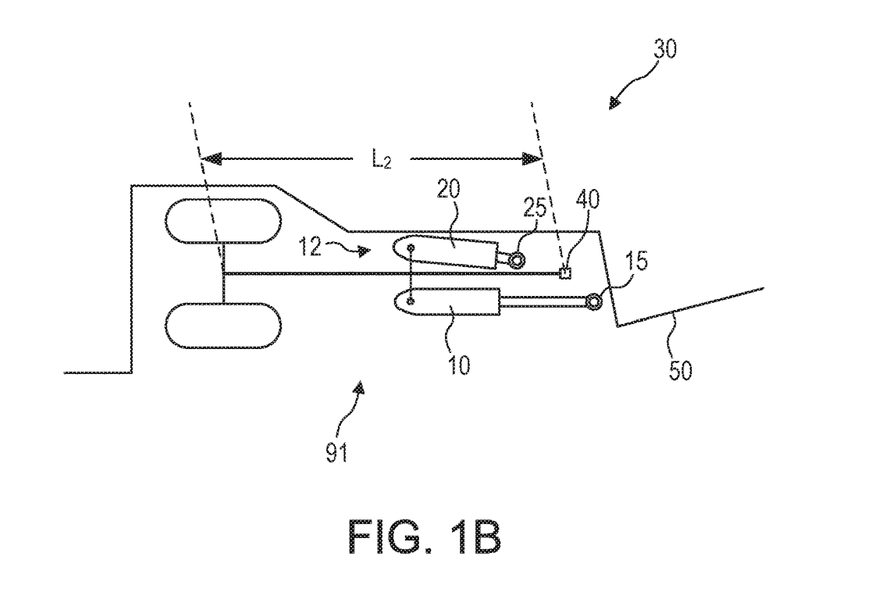
FIG. 1B illustrates a schematic diagram of the landing gear arrangement of FIG. 1A in a fully stowed position, in accordance with various embodiments.

In various embodiments, an axle 34 and one or more tires 36 may be coupled to shock strut 32. Shock strut 32 may support aircraft structure 50. In various embodiments, aircraft structure 50 may comprise a wing, a fuselage, or any other portion of an aircraft. Shock strut 32 may be coupled to aircraft structure 50 via a shock strut pivot 40 whereby shock strut 32 is pivotally mounted to aircraft structure 50. In various embodiments, shock strut pivot 40 may comprise a trunnion and associated braces/linkages. Shrink actuator 20 may be pivotally coupled to shock strut 32 and may be pivotally coupled to a first pivot 15. In various embodiments, second pivot 15 may comprise a portion of the trunnion. Retraction actuator 10 may be pivotally coupled to shock strut 32 and may be pivotally coupled to a second pivot 15. In various embodiments, second pivot 15 may comprise a portion of the trunnion.

In various embodiments, retraction actuator 10 may actuate to drive or move landing gear arrangement 30 between a deployed position 90 and a stowed position 91. In response to the actuation of retraction actuator 10, shock strut 32 may pivot about shock strut pivot 40. The pivoting of shock strut 32 may cause shrink actuator 20 to rotate about first pivot 25. In other words, shrink actuator 20 may be driven in response to retraction actuator 10 driving shock strut 32. In this regard, shrink actuator 20 may be passive. Because the point of rotation of shrink actuator 20 is offset from the point of rotation of shock strut 32, shrink actuator 20 may extend and/or compress in response to the pivoting of shock strut 32. Stated differently, shrink actuator 20 may be driven by retraction actuator 10. In this regard, a force exerted by retraction actuator 10, via shock strut 32, may cause shrink actuator 20 to extend and/or compress. In this regard, shrink actuator 20 may be passive.

Shrink actuator 20 may move between an unshrink position 11 and a shrink position 12 in response to shock strut 32 moving between the stowed position 91 and the deployed position 90. In this regard, shock strut 32 may comprise a first length $L_1$ in the unshrink position 91 and may comprise a second length $L_2$ in the shrink position. First length $L_1$ may be greater than second length $L_2$. Shrink actuator 20 may cause shock strut 32 to extend in response to shrink actuator moving to the unshrink position 11. Shrink actuator 20 may cause shock strut 32 to shrink in response to shrink actuator moving to the shrink position 12.

In various embodiments, retraction actuator 10 may extend to move from the deployed position 90 to the stowed position 91. Shrink actuator 20 may compress in response to retraction actuator 10 extending. In various embodiments, retraction actuator 10 may compress to move from the stowed position 91 to the deployed position 90. Shrink actuator 20 may extend in response to retraction actuator 10 compressing. However, in various embodiments, the locations of first pivot 25 and second pivot 15 may be moved relative to strut pivot 40 to tune the direction and length of the stroke of shrink actuator 20 and/or retraction actuator 10. In this regard, it is contemplated herein that retraction actuator 10 may compress to move from the deployed position 90 to the stowed position 91. Shrink actuator 20 may extend in response to retraction actuator 10 compressing. In various embodiments, retraction actuator 10 may extend to move from the stowed position 91 to the deployed position 90. Shrink actuator 20 may compress in response to retraction actuator 10 extending. This may be accomplished, for example, by swapping the positions of shrink actuator 20 and retraction actuator 10. Furthermore, it is contemplated herein that both retraction actuator 10 and shrink actuator 20 may extend when landing gear arrangement 30 moves from the deployed position 90 to the stowed position 91. In this regard, both retraction actuator 10 and shrink actuator 20 may compress when landing gear arrangement 30 moves from the stowed position 91 to the deployed position 90. This may be accomplished, for example, by moving first pivot 25 to be concentric with second pivot 15, or by moving second pivot 15 to the same side of shock strut 32 as first pivot 25. Furthermore, it is contemplated herein that both retraction actuator 10 and shrink actuator 20 may compress when landing gear arrangement 30 moves from the deployed position 90 to the stowed position 91. In this regard, both retraction actuator 10 and shrink actuator 20 may extend when landing gear arrangement 30 moves from the stowed position 91 to the deployed position 90. This may be accomplished, for example, by moving second pivot 15 to be concentric with first pivot 25, or by moving second pivot 15 to the same side of shock strut 32 as first pivot 25. Furthermore, the attachment points of shrink actuator 20 and retraction actuator 10 to shock strut 32 may be similarly adjusted to tune the direction and length of the stroke of shrink actuator 20 and/or retraction actuator 10.

Figure 2A:
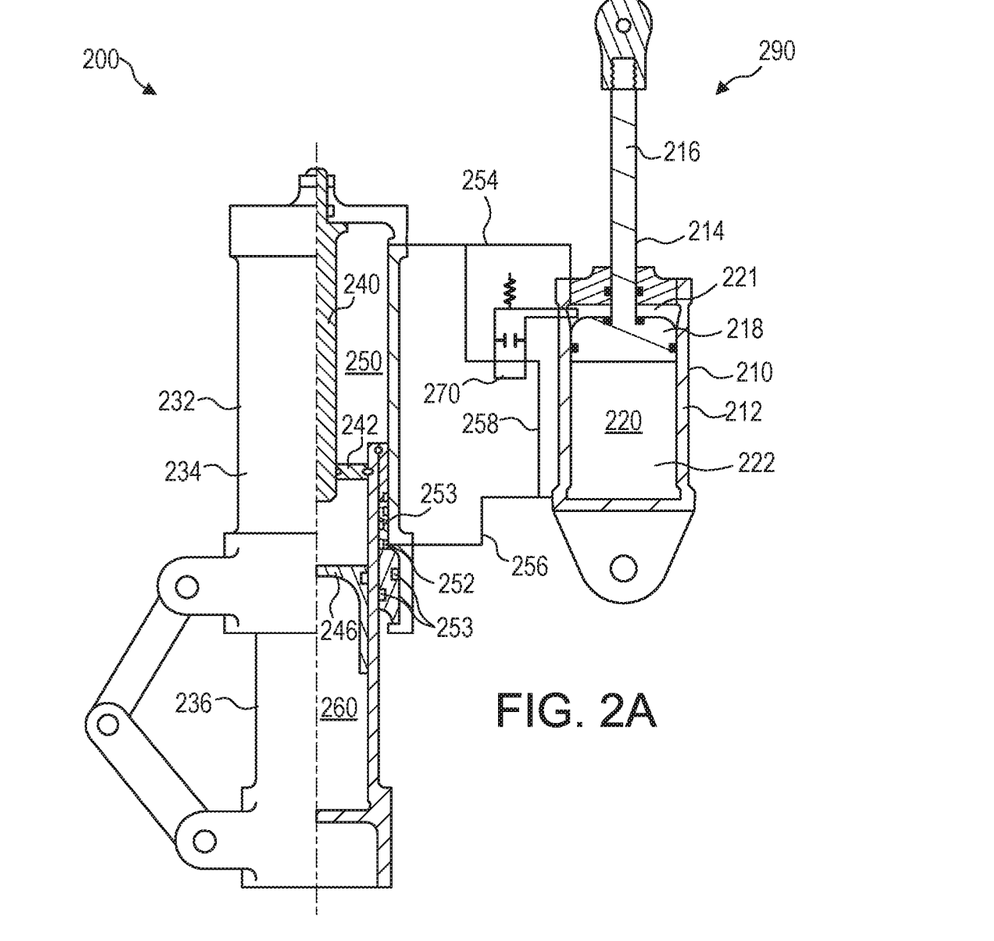
FIG. 2A illustrates a partial cross-section schematic view of a landing gear arrangement with a shock strut in an unshrunk position, in accordance with various embodiments.
Figure 2B:
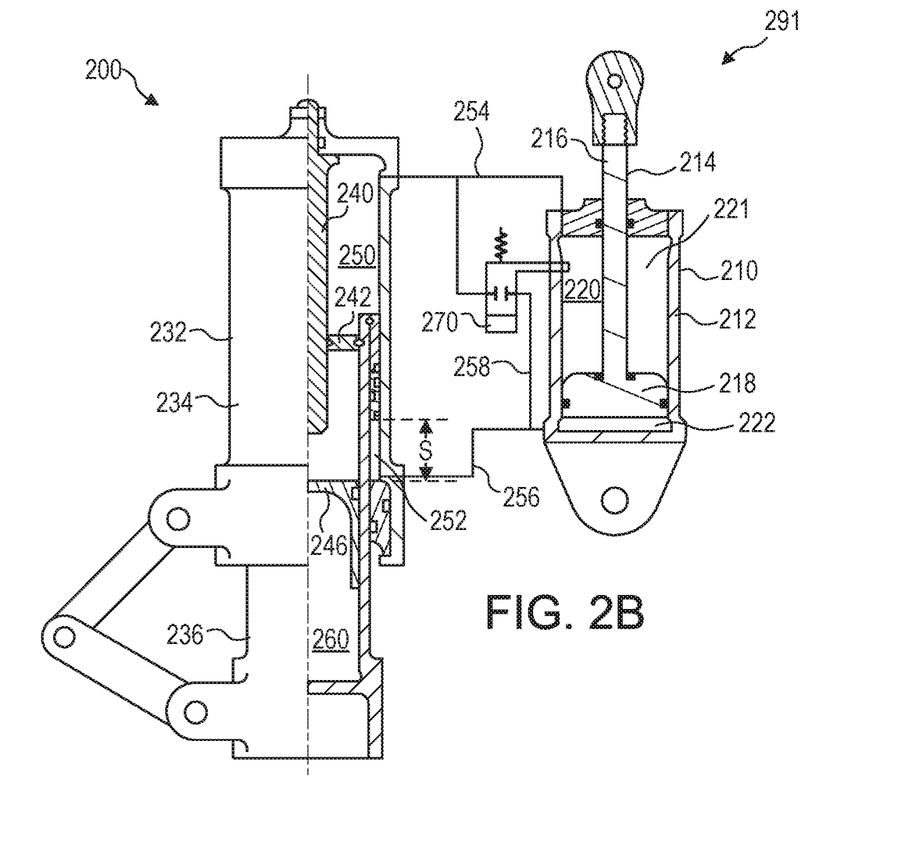
FIG. 2B illustrates a partial cross-section schematic view of the landing gear arrangement of FIG. 2A with the shock strut in a shrunk position, in accordance with various embodiments.

With combined reference to FIG. 2A and FIG. 2B, a landing gear arrangement 200 is illustrated, in accordance with various embodiments. Landing gear arrangement 200 may comprise a shock strut 232 and a shrink actuator 210. Shrink actuator 210 may be operatively coupled to shock strut 232. Shock strut 232 may be configured to shrink or extend in response to actuation of shrink actuator 210. In various embodiments, shrink actuator 20 of FIG. 1A and FIG. 1B may be similar to shrink actuator 210 of FIG. 2A and FIG. 2B. In various embodiments, shock strut 32 of FIG. 1A and FIG. 1B may be similar to shock strut 232 of FIG. 2A and FIG. 2B.

In various embodiments, shock strut 232 may comprise a strut body 234 and a strut piston 236. Strut piston 236 may be received by strut body 234 and may translate relative thereto. Shock strut 232 may comprise a metering pin 240. A piston ring 242 may engage metering pin 240 and translate relative thereto. Shock strut 232 may comprise a separator piston 246. Separator piston 246 may separate strut hydraulic fluid chamber 250 and gas chamber 260. Separator piston 246 may be disposed within strut piston 236.

In various embodiments, shock strut 232 may comprise a shrink chamber 252. Shrink chamber 252 may be defined between strut piston 236 and strut body 234. In accordance with principles disclosed herein, hydraulic fluid is pumped into strut shrink chamber 252 via conduit 256. The hydraulic fluid compresses the strut piston 236 into strut body 234, increasing the volume of strut shrink chamber 252, and decreasing the volume of strut hydraulic fluid chamber 250. In this manner, landing gear arrangement 200 is permitted to shrink upon retraction. Shock strut 232 may extend in response to a hydraulic fluid being pumped out or released from the shrink chamber 252. Stated differently, strut piston 236 may extend from strut body 234 in response to a hydraulic fluid exiting shrink chamber 252. In various embodiments, the hydraulic fluid may be pumped into and/or out strut shrink chamber 252 in response to mechanical movement of piston 214 relative to piston housing 212.

In various embodiments, shrink actuator 210 may comprise a piston housing 212 and a piston 214. Piston housing 212 may define a cavity 220. Piston 214 may comprise a piston rod 216 and a piston head 218. Piston 214 may translate relative to piston housing 212. Piston 214 may be received by piston housing 212. Piston head 218 may separate cavity 220 into a first chamber (also referred to herein as an overflow chamber) 221 and a second chamber (also referred to herein as a shrink actuator chamber) 222.

In various embodiments, first chamber 221 may receive hydraulic fluid from strut hydraulic fluid chamber 250 via conduit 254. In various embodiments, first chamber 221 may receive hydraulic fluid from strut hydraulic fluid chamber 250 via conduit 254 in response to piston 214 moving to a shrink position 291, as illustrated in FIG. 2B. Strut hydraulic fluid chamber 250 may receive the hydraulic fluid from first chamber 221 via conduit 254. In various embodiments, strut hydraulic fluid chamber 250 may receive the hydraulic fluid from first chamber 221 via conduit 254 in response to piston 214 moving to an unshrink position 290, as illustrated in FIG. 2A. Second chamber 222 may receive a hydraulic fluid from shrink chamber 252 via conduit 256. In various embodiments, second chamber 222 may receive a hydraulic fluid from shrink chamber 252 via conduit 256 in response to piston 214 moving to an unshrink position 290. Shrink chamber 252 may receive the hydraulic fluid from second chamber 222 via conduit 256. In various embodiments, shrink chamber 252 may receive the hydraulic fluid from second chamber 222 via conduit 256 in response to piston 214 moving to a shrink position 291. For example, with reference to FIG. 2B, shrink chamber 252 may grow in volume in response to piston 214 moving to the shrink position 291. Strut piston 236 may be shrunk or compressed into strut body 234 by a shrink stroke length S in response to shrink actuator 210 moving to the shrink position 291.

In various embodiments, a connecting conduit 258 may be in fluid communication with conduit 254 and conduit 256 via a valve 270. Valve 270 may be coupled to shrink actuator 210. Valve 270 may be actuated in response to a position of piston 214 relative to piston housing 212. Valve 270 may be opened in response to shrink actuator 210 reaching the unshrink position 11 with the landing gear in the deployed position 90, with momentary reference to FIG. 1A. In this regard, the pressure of strut hydraulic fluid chamber 250 and shrink chamber 252 may be substantially equal in response to valve 270 opening. Stated differently, the pressure of strut hydraulic fluid chamber 250 and shrink chamber 252 may be substantially equal in response to shock strut 232 being in a fully deployed position (e.g., deployed position 90 of FIG. 1A). In this manner, whereas strut shrink chamber 252 would have otherwise been at a lower pressure than strut hydraulic fluid chamber 250, with strut shrink chamber 252 in fluid communication with strut hydraulic fluid chamber 250, strut shrink chamber 252 and strut hydraulic fluid chamber 250 may comprise substantially equal pressures. This may energize the seals 253 in fluid communication with strut shrink chamber 252 to prevent leakage. Furthermore, in a case where hydraulic fluid has leaked from strut shrink chamber 252, strut shrink chamber 252 may be replenished with hydraulic fluid from strut hydraulic fluid chamber 250. Valve 270 may be closed in response to shrink actuator 210 moving away from unshrink position 11 towards shrink position 12, with momentary reference to FIG. 1B. In this regard, the pressure of strut hydraulic fluid chamber 250 may be decoupled from the pressure in shrink chamber 252 in response to valve 270 closing. By closing valve 270, pressure in shrink chamber 252 may build to increase shrink stroke length S. In the illustrated embodiment of FIG. 2B, pressure within shrink chamber 252 may increase in response to piston 214 compressing within piston housing 212, thereby pushing hydraulic fluid from second chamber 222 into shrink chamber 252.

Figure 3A:
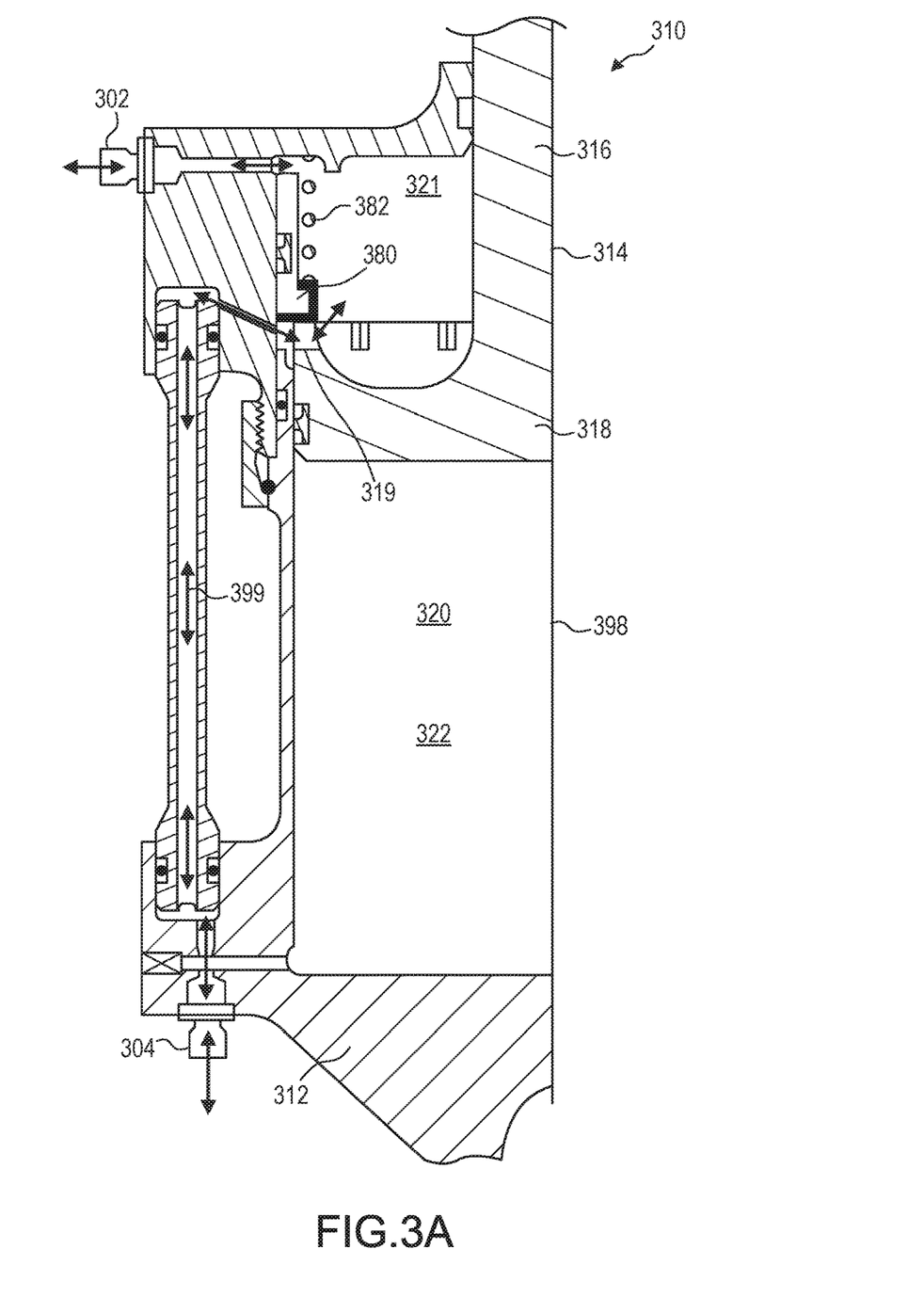
FIG. 3A illustrates a cross-section view of a shrink actuator with a piston ring in an open position, allowing a first port to be in fluid communication with a second port, in accordance with various embodiments.
Figure 3B:
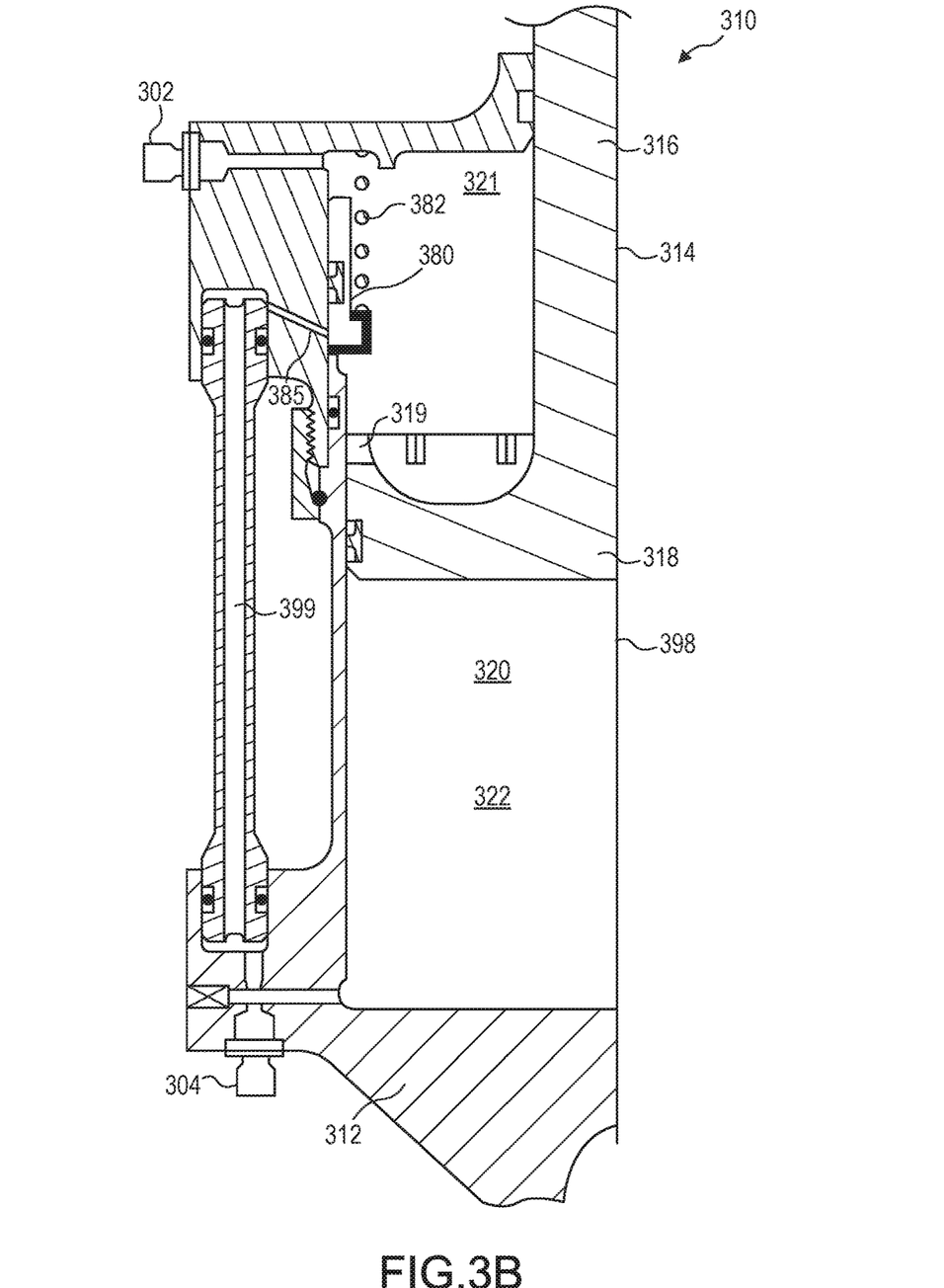
FIG. 3B illustrates a cross-section view of the shrink actuator of FIG. 3A with the piston ring in a closed position, preventing the first port from fluid communication with the second port, in accordance with various embodiments.

With reference to FIG. 3A and FIG. 3B, a cross-section view of a shrink actuator 310 is illustrated, in accordance with various embodiments. In various embodiments, shrink actuator 20 of FIG. 1A and FIG. 1B may be similar to shrink actuator 310 of FIG. 3A and FIG. 3B. In various embodiments, shrink actuator 310 may comprise a centerline axis 398. In various embodiments, shrink actuator 310 may comprise a piston housing 312 and a piston 314. Piston housing 312 may define a cavity 320. Piston 314 may comprise a piston rod 316 and a piston head 318. Piston 314 may translate relative to piston housing 312. Piston 314 may be received by piston housing 312. Piston head 318 may separate cavity 320 into a first chamber (also referred to herein as an overflow chamber) 321 and a second chamber (also referred to herein as a shrink actuator chamber) 322.

In various embodiments, shrink actuator 310 may comprise a piston ring 380. Piston ring 380 may be disposed within cavity 320. Piston ring 380 may be disposed within first chamber 321. Shrink actuator 310 may comprise a spring member (also referred to herein as a first spring member) 382. Spring member 382 may be operatively coupled to piston ring 380. Spring member 382 may be coupled between piston ring 380 and piston housing 312. Spring member 382 may bias piston ring 380. In various embodiments, piston housing 312 may comprise a first port 302. First port 302 may be in fluid communication with first chamber 321. First port 302 may be disposed in piston housing 312. In various embodiments, piston housing 312 may comprise a second port 304. Second port 304 may be in fluid communication with second chamber 322. Second port 304 may be disposed in piston housing 312.

In various embodiments, a slot 319 may be disposed in piston head 318. Piston head 318 may engage piston ring 380, moving piston ring 380 against the bias of spring member 382 to place first port 302 in fluid communication with second port 304. In this regard, a hydraulic fluid flow path, illustrated by arrows 399, may be created between first port 302 and second port 304 in response to piston ring 380 being moved by piston head 318. In various embodiments, piston ring 380 may translate along centerline axis 398.

With reference to FIG. 3B, piston ring 380 is illustrated in a sealed position preventing fluid communication between first port 302 and second port 304. In the sealed position, piston ring 380 may seal orifice 385. In various embodiments, piston ring 380 may seal orifice 385 in response to piston 314 translating along centerline axis 398. Although illustrated as being in an open position when piston 314 is in a fully extended position, it is contemplated herein that piston ring 380 may be designed to be in the open position when piston 314 is in a fully compressed position.

Figure 4A:
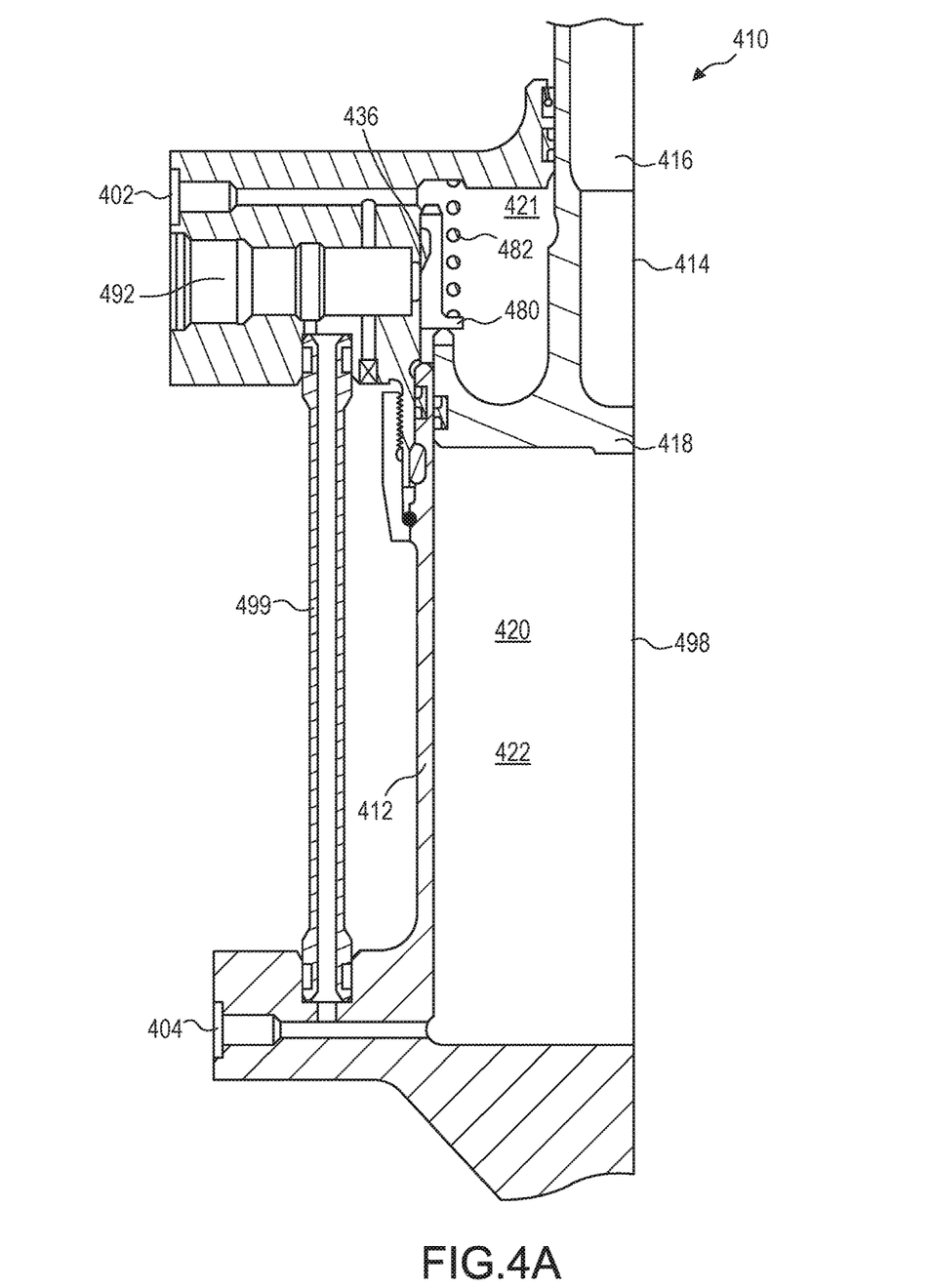
FIG. 4A illustrates a partial cross-section view of a shrink actuator with a removable valve in an open position, in accordance with various embodiments.

With reference to FIG. 4A, a cross-section view of a shrink actuator 410 is illustrated, in accordance with various embodiments. In various embodiments, shrink actuator 20 of FIG. 1A and FIG. 1B may be similar to shrink actuator 410 of FIG. 4A through FIG. 4C. In various embodiments, shrink actuator 410 may comprise a centerline axis 498. In various embodiments, shrink actuator 410 may comprise a piston housing 412 and a piston 414. Piston housing 412 may define a cavity 420. Piston 414 may comprise a piston rod 416 and a piston head 418. Piston 414 may translate relative to piston housing 412. Piston 414 may be received by piston housing 412. Piston head 418 may separate cavity 420 into a first chamber (also referred to herein as an overflow chamber) 421 and a second chamber (also referred to herein as a shrink actuator chamber) 422.

In various embodiments, shrink actuator 410 may comprise a piston ring 480. Piston ring 480 may be disposed within cavity 420. Shrink actuator 410 may comprise a spring member (also referred to herein as a first spring member) 482. Spring member 482 may be operatively coupled to piston ring 480. Spring member 482 may be coupled between piston ring 480 and piston housing 412. Spring member 482 may bias piston ring 480. In various embodiments, piston housing 412 may comprise a first port 402. First port 402 may be in fluid communication with first chamber 421. First port 402 may be disposed in piston housing 412. In various embodiments, piston housing 412 may comprise a second port 404. Second port 404 may be in fluid communication with cavity 420. Second port 404 may be disposed in piston housing 412.

Figure 4B:
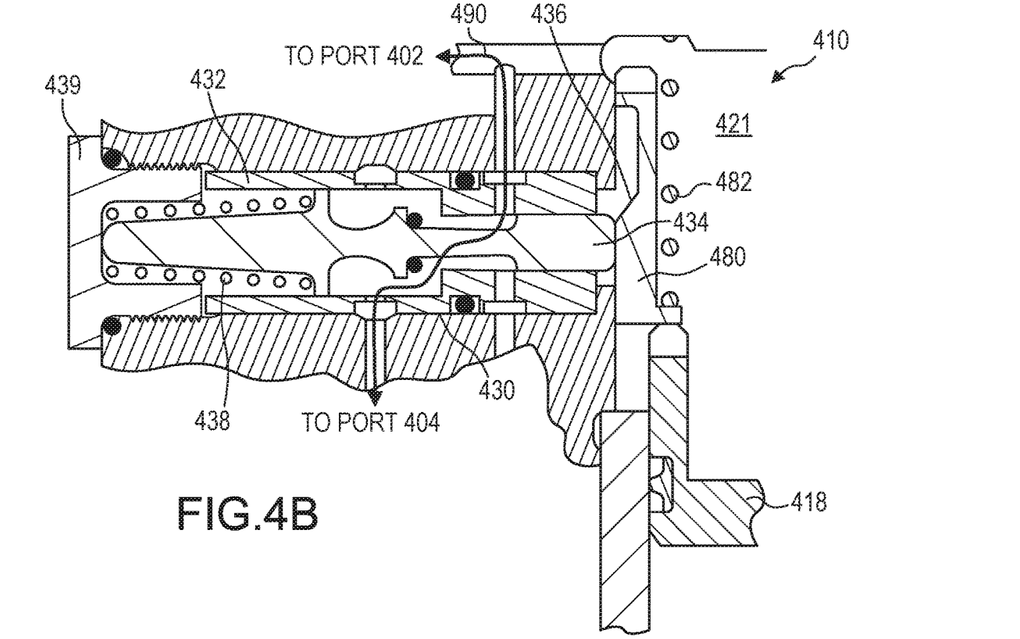
FIG. 4B illustrates a cross-section view of the removable valve of FIG. 4A with the removable valve in the open position, in accordance with various embodiments.

In various embodiments, with combined reference to FIG. 4A and FIG. 4B, shrink actuator 410 may comprise a valve cavity 492 configured to receive a valve 430. In this regard, in various embodiments, shrink actuator 410 may comprise a valve 430. Valve 430 may comprise a valve housing 432 and a plunger 434. Piston ring 480 may be operatively coupled to valve 430. Piston ring 480 may comprise a ramp surface 436. Ramp surface 436 may engage plunger 434. Plunger 434 may extend and/or compress relative to valve housing 432 in response to piston ring 480 translating along centerline axis 498.

With reference to FIG. 4B, a portion of shrink actuator 410 is illustrated with valve 430 in an open position, in accordance with various embodiments. Valve 430 may comprise a spring member (also referred to herein as a second spring member) 438. Spring member 438 may be operatively coupled to plunger 434. In various embodiments, piston head 418 may be configured to engage piston ring 480. In various embodiments, piston ring 480 may be configured to engage plunger 434 to actuate the valve 430. In this regard, piston head 418 may engage piston ring 480 to move piston ring 480 against the bias of spring member 482, thereby compressing plunger 434 into valve housing 432 against the bias of spring member 438. A flow path 490 may be created between first port 402 and second port 404 in response to plunger 434 compressing into valve housing 432. Valve 430 may be opened in response to a landing gear moving to the fully deployed position (e.g., deployed position 90 of FIG. 1A).

Figure 4C:
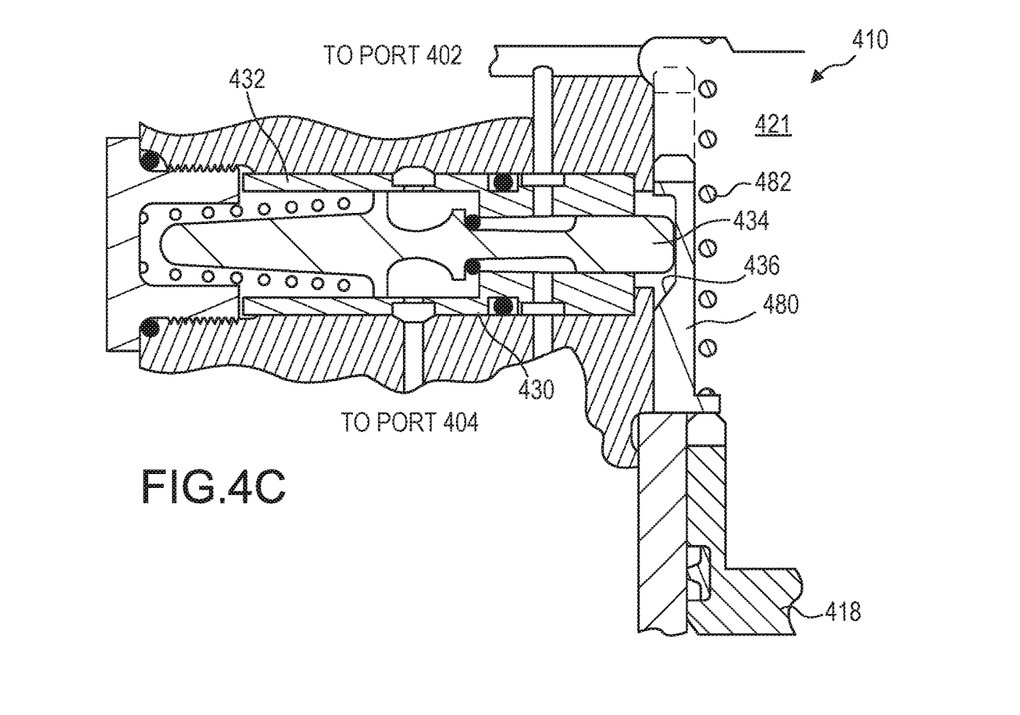
FIG. 4C illustrates a cross-section view of the removable valve of FIG. 4A with the removable valve in a closed position, in accordance with various embodiments.

With reference to FIG. 4C, a portion of shrink actuator 410 is illustrated with valve 430 in a closed position, in accordance with various embodiments. Piston head 418 may translate away from piston ring 480, thereby allowing the bias of spring member 482 to move piston ring 480 along centerline axis 498, with momentary reference to FIG. 4A. Plunger 434 may extend from valve housing 432, via the bias of spring member 438, in response to piston ring 480 moving along centerline axis 498. Plunger 434 may seal against valve housing 432, thereby preventing fluid communication between first port 402 and second port 404. Stated differently, fluid communication between first port 402 and second port 404 may be prevented in response to piston ring 480 translating within shrink actuator 410. Valve 430 may be closed in response to a landing gear moving away from a deployed position 90 and towards a stowed position 91, with momentary reference to FIGS. 1A and 1B).

In various embodiments, valve 430 may be removably coupled to shrink actuator 410. Valve 430 may comprise a cap 439. Cap 439 may retain valve housing to shrink actuator 410. Cap 439 may be threadingly coupled to shrink actuator 410.

Figure 5:
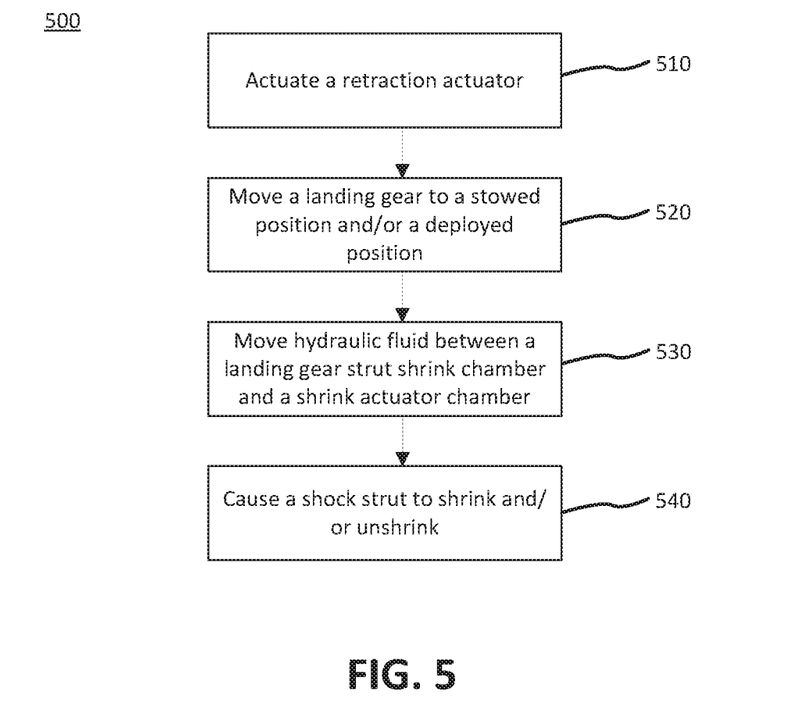
FIG. 5 illustrates a flow chart of a method, in accordance with various embodiments.

With reference to FIG. 5, a method 500 is provided, in accordance with various embodiments. Method 500 includes actuating a retraction actuator (step 510). Method 500 includes moving a landing gear to at least one of a deployed position and a stowed position (step 520). Method 500 includes moving hydraulic fluid between a landing gear strut shrink chamber and a shrink actuator chamber (step 530). Method 500 includes causing a shock strut to at least one of shrink and unshrink (step 540).

With combined reference to FIG. 1A, FIG. 1B, FIG. 2A, and FIG. 5, step 510 may include actuating retraction actuator 10 of landing gear arrangement 30. Step 520 may include moving landing gear arrangement 30 to at least one of a deployed position 90 and a stowed position 91 in response to the actuating. Step 530 may include moving hydraulic fluid between strut shrink chamber 252 and a second chamber 222 of shrink actuator 210 in response to the moving. Step 530 may include moving hydraulic fluid between strut shrink chamber 252 and a second chamber 322 of shrink actuator 310 in response to the moving. Step 530 may include moving hydraulic fluid between strut shrink chamber 252 and a second chamber 422 of shrink actuator 410 in response to the moving. Step 540 may include causing shock strut 232 to at least one of shrink and unshrink in response to the moving the hydraulic fluid.

In various embodiments, while the landing gear shrinking systems described herein have been described in the context of aircraft applications; however, one will appreciate in light of the present disclosure, that the system described herein may be used in connection with various other vehicles, for example, cars, trucks, busses, trains, boats, and submersible vehicles, or any other vehicle or device, having a shock absorbing strut.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A landing gear arrangement comprising:
   a shock strut;
   a retraction actuator; and
   a shrink actuator;
   wherein the retraction actuator moves the shock strut between a stowed position and a deployed position, and the shrink actuator moves between a shrink position and an unshrink position in response to the shock strut moving between the stowed position and the deployed position,
   wherein the shock strut is in fluid communication with the shrink actuator.

2. The landing gear arrangement of claim 1, wherein the shrink actuator is driven by the retraction actuator.

3. The landing gear arrangement of claim 2, wherein
   the retraction actuator drives the shock strut, and
   the shrink actuator is driven in response to the retraction actuator driving the shock strut.

4. The landing gear arrangement of claim 3, wherein the shrink actuator is driven by the retraction actuator, via the shock strut.

5. The landing gear arrangement of claim 3, wherein the shrink actuator is coupled between the shock strut and a first pivot.

6. The landing gear arrangement of claim 5, wherein the retraction actuator is coupled between the shock strut and a second pivot.

7. A shrink actuator for a landing gear comprising:
   a piston housing defining a cavity;
   a piston comprising:
      a piston rod; and
      a piston head;
   a first port disposed in the piston housing;
   a second port disposed in the piston housing;
   a valve coupled to the piston housing, wherein the valve is configured to actuate in response to the piston moving between an unshrink position and a shrink position;
   a piston ring disposed within the cavity; and
   a first spring member operatively coupled to the piston ring,
   wherein the valve comprises:
      a valve housing;
      a plunger; and
      a second spring member operatively coupled to the plunger, wherein the piston head is configured to engage the piston ring, and the piston ring is configured to engage the plunger to actuate the valve.

8. The shrink actuator of claim 7, wherein the piston head separates the cavity into a first chamber and a second chamber.

9. The shrink actuator of claim 8, wherein the first chamber and the second chamber are in fluid communication in response to the valve moving to an open position.

10. The shrink actuator of claim 9, wherein the valve is configured to be in the open position in response to the landing gear moving to a deployed position.

11. The shrink actuator of claim 9, wherein the piston head comprises a ramp surface configured to engage the plunger.

12. The shrink actuator of claim 8, wherein the first port is in fluid communication with the first chamber and the second port is in fluid communication with the second chamber.

13. The shrink actuator of claim 12, wherein the first port is configured to be in fluid communication with a strut hydraulic fluid chamber and the second port is configured to be in fluid communication with a strut shrink chamber.

14. The shrink actuator of claim 8, wherein the piston head comprises a slot,
wherein in response to the piston head engaging the piston ring, the slot partially defines a flow path between the first port and the second port.

15. A method comprising:
actuating a retraction actuator of a landing gear arrangement;
moving a landing gear to at least one of a deployed position and a stowed position in response to the actuating;
moving hydraulic fluid between a landing gear strut shrink chamber and a shrink actuator chamber of a shrink actuator in response to the moving, wherein the shrink actuator is driven by the retraction actuator; and
causing a shock strut to at least one of shrink and unshrink in response to the moving the hydraulic fluid.

16. The method according to claim 15, further comprising:
engaging a piston ring of the shrink actuator to at least one of open and close a valve of the shrink actuator; and
causing an overflow chamber to be in fluid communication with the shrink actuator chamber in response to the valve opening.

17. The method according to claim 15, further comprising:
pivoting the shrink actuator in response to the actuation of the retraction actuator; and
causing, by the retraction actuator, a piston of the shrink actuator to at least one of retract and extend in response to the pivoting.

* * * * *